March 22, 1932.  S. K. SMITH  1,850,899

CHART WITH MOVABLE LINES

Filed Oct. 1, 1930

WITNESSES
Geo. W. Naylor
A. L. Kitchin

INVENTOR
Sherman K. Smith
BY Munn & Co.
ATTORNEYS

Patented Mar. 22, 1932

1,850,899

UNITED STATES PATENT OFFICE

SHERMAN K. SMITH, OF NEW YORK, N. Y.

CHART WITH MOVABLE LINES

Application filed October 1, 1930. Serial No. 485,738.

This invention relates to charts and particularly to an improved chart having stationary lines or members and movable members coacting therewith, the object being to present a chart wherein an object may be shown in one position and then shown in different positions by shifting all or certain of the movable members.

Another object in view is to provide a chart which may be used for any purpose wherein certain or all the members are shiftable manually, whereby they may take different positions to indicate one or more objects in different positions.

A further object, more specifically, is to provide a chart adapted to be used as a phonetic chart for indicating to anyone the position of the tongue and other associated parts when speaking or singing.

In the accompanying drawings—

Referring to the accompanying drawings, 1 indicates a board or support of any kind, on which permanent or fixed members or lines 2 are formed, and associated with the permanent lines are a number of flexible or adjustable members 3.

Figure 3:
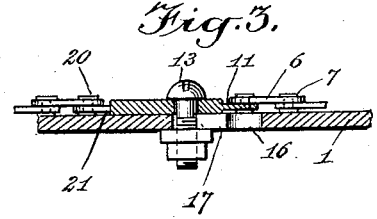
Fig. 3 is a detail fragmentary sectional view through Fig. 1, on the line 3—3, the same being on an enlarged scale.

On the chart shown in Fig. 3, a head has been shown with movable or adjustable members 3 disclosing the position of the lips, chin, tongue and palate in certain positions. It is evident, however, that the entire chart could be made of adjustably movable members similar to the members 3, and instead of having a phonetic chart, the invention could be applied to other charts or devices, as, for instance, to indicate a shore line and how it shifts when the tide comes and goes.

Figure 1:
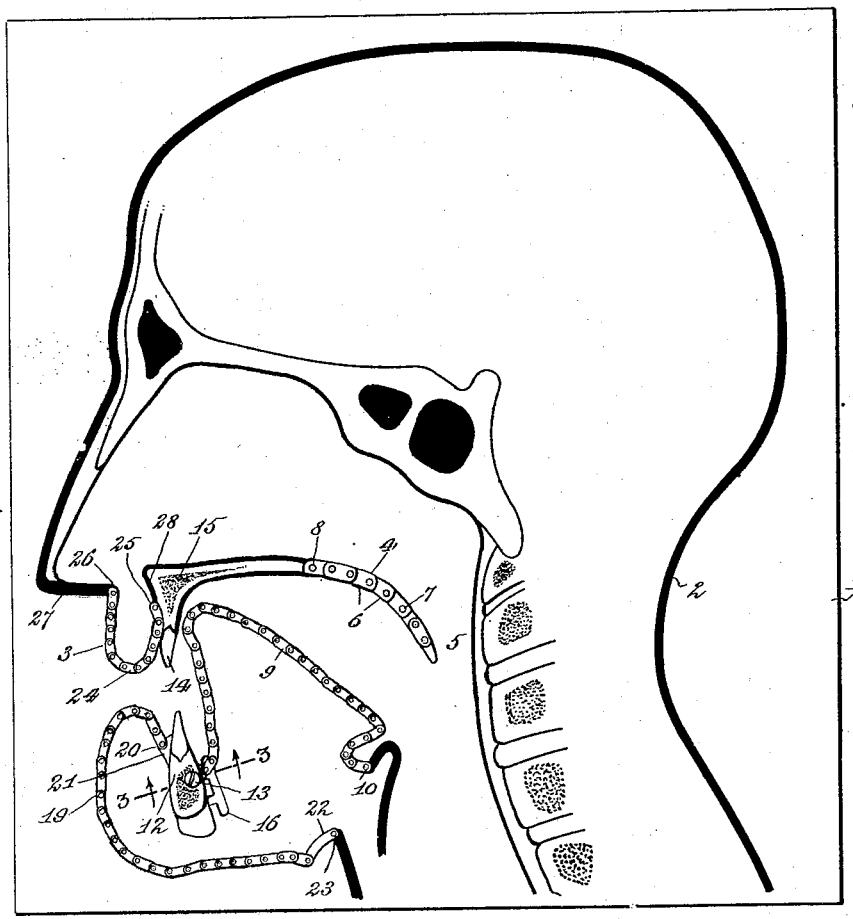
Figure 1 is a plan view of a chart disclosing one embodiment of the invention.
Figures 4, 5:
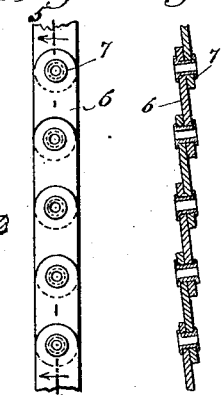
Fig. 4 is a short section of one of the movable members shown in Fig. 1.
Fig. 5 is a sectional view through Fig. 4, on the line 5—5.

When used as a phonetic chart, preferably the structure is arranged as shown in Fig. 1, and this structure will be specifically described, but it will be understood that it could be used with other arrangement of charts for the same purpose or for other purposes, and as shown in the drawings, a member 4 is provided which represents the soft palate. In talking or singing, the palate moves up or down and adjusts itself to vary the opening in the throat represented by 5, according to different sounds produced. The member 4 is shown as made up of a number of sections 6, (Figs. 4 and 5). These sections are all preferably of the same length but not necessarily so. Rivets 7 secure these sections together, these rivets being shown as eyelets with the flanges of the eyelets securing the sections together so that the resiliency of the eyelets and the sections will produce a friction sufficient to retain the respective links in any position to which they may be moved. Preferably the sections 6 are formed of bakelite or other more or less resilient material so that when the parts are secured together by rivets 7, the links may be readily swung around the rivets but will remain in any adjusted position. This pinching action is in all the movable members 3. It will be evident that other material besides bakelite may be used without departing from the spirit of the invention, the essential part being that the rivets or other means must secure the parts together sufficiently rigidly to prevent accidental displacement while permitting a person to readily swing or shift any link 6.

The member 4 is secured by a rivet or pin 8 to the board 1, while the various links 6 are pivotally connected together, as shown in Fig. 5, whereby the entire member 4 may swing around the pin 8 or any link or any group of links may be moved into the desired position.

The adjustable or movable member 9 is of identical structure to that shown in Fig. 5 and is adapted to show the different positions of the tongue. According to one authority the position of the tongue shown in the accompanying drawings, would indicate that the person is about to pronounce the latter N. By reason of the adjustability of the member 9, in case the position is not correct and in case it is desired to show the position of the tongue pronouncing another letter, the instructor or any person knowing the position of the tongue, could shift the member 9 to the correct position. At one end, the member 9 is secured to the board 1 by a pivot pin 10 and at the other it is secured to a shiftable member 12 by a bolt 13. The shiftable member 12 is shown as part of the lower jaw bone and the lower teeth coact with the upper teeth 14 and upper jaw bone 15. As shown in Fig. 1, the respective bones and teeth are positioned in the position taken by normal persons.

Some persons may have a protruding jaw and teeth or a receding jaw and teeth. To show these respective positions, the bolt 13 extends through a slot 16 and said slot is formed with notches 17 and 18, the notch 17 being used to position the lower jaw to indicate a protruding jaw, while the slot or notch 18 is used by the bolt 13 when the lower jaw which is to be illustrated is a receding jaw. When it is desired to illustrate normal speech by a normal person the jaw is moved in an up and down path which will cause the bolt 13 to move up and down in the slot 16.

From Figure 1 it will be noted that the movable member 19 is connected to the shiftable member 12 by a pin 20 extending through an extension 21, while the opposite end is connected through a comparatively long link 22 to a pin 23 which is carried by the board 1. The upper lip is formed by a movable member 24 connected by suitable pins at points 25 and 26 to the board 1. It will be noticed that the movable member 24 forms a continuation of the nose line 27 and also a continuation of part of the upper jaw line 28. The same is true of the other adjustably movable members. The movable members have been shown in connection with the parts of the lower portion of the head which assist in producing a proper enunciation or articulation, but it will be evident that these movable members may be used in connection with other parts of the body to show different positions thereof. For instance, a movable member could be used as the backbone line of a person and also as a line for certain muscles to indicate the different positions according to the position of the body. In view of this fact and as above outlined, the invention is not limited to a phonetic chart, a phonetic chart having been used in the accompanying drawings to illustrate a preferred embodiment of the invention.

Figure 6:
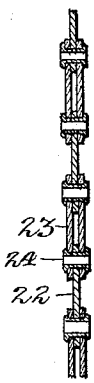
Figure 6 is a fragmentary sectional view similar to Figure 5 but showing a modified form of the invention.
Figure 2:
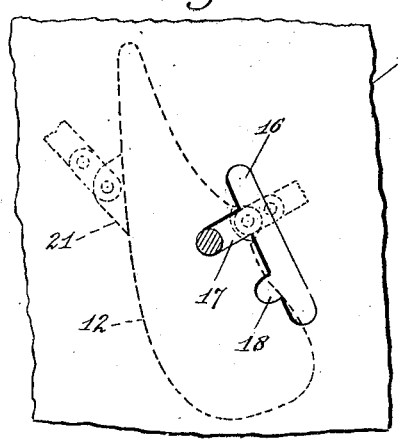
Fig. 2 is a rear view of part of the chart shown in Fig. 1, illustrating certain adjusting members forming part thereof.

In Figure 6 will be seen a slightly modified form of the movable member wherein the links are single and double alternately.

The single links 22 extend between the double links 23 and are connected thereto by suitable rivets 24 which pinch the parts sufficiently to hold the respective links in any position desired until appreciable strain is brought thereon. This form of link is adapted to lie flat on a flat surface and hold its position in an efficient manner because of the large contact portions of the double links 23 against the single links 22.

What I claim is:

1. A chart, including fixed lines and movable members acting as movable lines, said movable lines being formed of a plurality of swingable parts, each part being clamped to an adjacent part sufficiently to prevent accidental independent movement thereof each of said movable lines acting as a continuation of a fixed line.

2. A chart, including a base, fixed lines arranged on the base indicating part of the head of a person, movable members connected with said base and acting as continuations of the fixed lines, said movable members being in position to indicate certain parts of the head which shift their relative positions when speaking, each of said movable members being independently deformable to indicate the respective positions to which the natural parts move at different times, means for clamping the respective parts of each of said movable members together so that the movable members normally remain in any position in which they are placed regardless of the position of the base while permitting manual deformation at any time.

3. A device of the character described, including means forming a phonetic chart, which comprises a base, permanent lines forming in outline part of the head, movable members forming other parts of the head, including the lips, tongue, palate, and the movable lower jaw bone, one end of the tongue member and one end of the under lip member being pivotally connected to said lower jaw bone, and means for clamping said lower jaw bone in different positions to show the natural position and different distorted positions.

4. In a chart of the character described, a base, a movable lower jaw bone, a clamping screw extending through said jaw bone, said base being formed with a slot arranged for accommodating said screw, said slot extending in the direction of the natural jaw movement when speaking, said slot including radial notches extending from said slot for receiving the screw when the lower jaw bone is positioned to show a receding or protruding formation, and members coacting with the lower jaw bone for forming the outline of a head, including a section through the head, certain of said members being deformable and capable of remaining in the positions in which they are placed, some of said deformable lower members being connected with said lower jaw bone for indicating the relative position of the tongue, chin, and lower lip.

5. A chart including a base, fixed lines and movable members mounted on said base, said movable members acting as movable lines, each movable line being positioned to act as a continuation of a fixed line, each of said movable lines being formed with a plurality of swingably connected parts clamped together sufficiently to prevent accidental independent movement thereof, and means at each end of said movable lines for securing said ends to said base.

6. An educational chart including a base, a fixed line applied to the base, and a movable member applied to the base acting as a continuation of said fixed line, said movable member being formed of a plurality of parts clamped together sufficiently to prevent accidental independent movement thereof, means for connecting the respective ends of said movable member to the respective ends of said fixed line.

7. A device of the character described including a phonetic chart comprising a stiff base, a plurality of permanent lines carried by said base indicating in outline part of a head, a plurality of movable lines acting as continuations of the permanent lines and acting as the lips, the tongue and soft palate of the head, each of said members being independently deformable by pressure exerted in a plane parallel to said base so that said members are caused to take the different positions the natural parts would take when talking, singing or making other sounds, said movable members having the characteristic of remaining where placed regardless of the angle to which the chart may be positioned.

SHERMAN K. SMITH.